(12) United States Patent
Yang

(10) Patent No.: US 11,963,087 B2
(45) Date of Patent: Apr. 16, 2024

(54) SYSTEM INFORMATION TRANSMISSION METHOD, APPARATUS AND SYSTEM, AND COMPUTER-READABLE STORAGE MEDIUM

(71) Applicant: BEIJING XIAOMI MOBILE SOFTWARE CO., LTD., Beijing (CN)

(72) Inventor: Xing Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 601 days.

(21) Appl. No.: 17/265,272

(22) PCT Filed: Aug. 10, 2018

(86) PCT No.: PCT/CN2018/100022
§ 371 (c)(1),
(2) Date: Feb. 2, 2021

(87) PCT Pub. No.: WO2020/029266
PCT Pub. Date: Feb. 13, 2020

(65) Prior Publication Data
US 2021/0306934 A1    Sep. 30, 2021

(51) Int. Cl.
*H04W 48/10* (2009.01)
*H04W 68/00* (2009.01)
*H04W 72/23* (2023.01)

(52) U.S. Cl.
CPC .......... *H04W 48/10* (2013.01); *H04W 68/00* (2013.01); *H04W 72/23* (2023.01)

(58) Field of Classification Search
CPC ...... H04W 48/10; H04W 72/23; H04W 68/00
(Continued)

(56) References Cited

U.S. PATENT DOCUMENTS

2010/0297991 A1   11/2010   Dahlman et al.
2015/0249952 A1   9/2015    Lee et al.
(Continued)

FOREIGN PATENT DOCUMENTS

CN      101877825 A    11/2010
CN      105472528 A    4/2016
(Continued)

OTHER PUBLICATIONS

International Search Report and Written Opinion dated Apr. 26, 2019 in PCT/CN2018/100022 filed Aug. 10, 2018, 7 pages.
(Continued)

*Primary Examiner* — Obaidul Huq
(74) *Attorney, Agent, or Firm* — Oblon, McClelland, Maier & Neustadt, L.L.P.

(57) ABSTRACT

The present disclosure relates to a system information transmission method, apparatus and system, and a non-transitory computer-readable storage medium, belonging to the field of communication technology. The method can include sending a paging message including indication information, where the indication information is used to indicate other system information which is to be broadcast within a specified period of time. The method can further include broadcasting, within the specified period of time, the other system information indicated by the indication information. This method can reduce the number of system information requests and the frequency of repeatedly broadcasting other system information, thereby reducing waste of radio resources.

17 Claims, 5 Drawing Sheets

```
┌─────────────────────────────────────────────────────────┐
│          A paging message is received                    │ S21
└─────────────────────────────────────────────────────────┘
                              ↓
┌─────────────────────────────────────────────────────────┐
│ Other SI broadcast in a specified time period is received│ S22
│          according to indication information             │
└─────────────────────────────────────────────────────────┘
```

(58) Field of Classification Search
USPC .......................................... 370/310, 328, 329
See application file for complete search history.

(56) References Cited

U.S. PATENT DOCUMENTS

| | | | |
|---|---|---|---|
| 2016/0295503 | A1 | 10/2016 | Bucknell et al. |
| 2017/0064764 | A1 | 3/2017 | Ke et al. |
| 2017/0373902 | A1 | 12/2017 | Zhang et al. |
| 2018/0176962 | A1 | 6/2018 | Wu |
| 2018/0199267 | A1* | 7/2018 | Lin ................ H04W 48/14 |
| 2018/0332433 | A1* | 11/2018 | Wu ................ H04W 68/00 |
| 2019/0223094 | A1* | 7/2019 | Ingale ............. H04W 48/10 |
| 2019/0268830 | A1* | 8/2019 | Kim ............. H04W 36/0077 |

FOREIGN PATENT DOCUMENTS

| | | |
|---|---|---|
| CN | 106992953 A | 7/2017 |
| CN | 107005918 A | 8/2017 |
| CN | 107040994 A | 8/2017 |
| CN | 107079349 A | 8/2017 |
| CN | 107371218 A | 11/2017 |
| CN | 107872876 A | 4/2018 |
| CN | 107889190 A | 4/2018 |
| CN | 108141299 A | 6/2018 |
| WO | WO 2018/016865 A1 | 1/2018 |
| WO | WO 2018/028670 A1 | 2/2018 |
| WO | WO 2018/111034 A1 | 6/2018 |

OTHER PUBLICATIONS

Combined Chinese Office Action and Search Report dated Oct. 29, 2020 in Patent Application No. 201880001008.6 (with English language translation), 20 pages.

LG Electronics Inc., "Other SI delivery in broadcast manner," 3GPP TSG-RAN WG2 #95bis, R2-167050, Oct. 2016, 3 pages.

Zte, et al., "Consideration on the Other SI delivery in NR," 3GPP TSG-RAN WG2 Meeting #95bis, R2-166343, Oct. 2016, 6 pages.

Zte, et al., "Further consideration on the Other SI delivery in NR," 3GPP TSG-RAN WG2 Meeting #96, R2-167844, Nov. 2016, 4 pages.

ETRI, "Indication of Other SI broadcast," 3GPP TSG-RAN WG2 Meeting #100, R2-1713579, 2017, 3 pages.

3GPP TSG-RAN3#99 R3-181566, Athens, Greece, Feb. 26-Mar. 2, 2018, Title: Remove PDCP change indication in SN modification request message, Source to WG: ZTE, the whole document, 16 pages.

3GPP TSG-RAN WG2 #99 Meeting R2-1708071 (Revision of R2-1706767), Berlin, Germany, Aug. 21-25, 2017, Agenda item: 10.4.1.5.4, Source: Huawei, HiSilicon, Title: Considerations on System Information scheduling, Document for: Discussion and Decision. the whole document. 4 pages.

3GPP TSG RAN WG1 Meeting #91 R1-1719761, Reno, USA, Nov. 27-Dec. 1, 2017, Source: vivo, Title: Remain details on other system information delivery, Agenda Item: 7.1.2.3, Document for: Discussion and Decision. the whole document. 3 pages.

* cited by examiner

SYSTEM INFORMATION TRANSMISSION METHOD, APPARATUS AND SYSTEM, AND COMPUTER-READABLE STORAGE MEDIUM

RELATED APPLICATION

This application claims the benefit of International Application No. PCT/CN2018/100022, entitled "SYSTEM INFORMATION TRANSMISSION METHOD, APPARATUS AND SYSTEM, AND COMPUTER-READABLE STORAGE MEDIUM" and filed on Aug. 10, 2018, which is incorporated herein by reference in its entirety.

TECHNICAL FIELD

The present disclosure generally relates to the technical field of communications, including to a system information (SI) transmission method, apparatus and system, and a computer-readable storage medium.

BACKGROUND

In a 5th-generation (5G) communication system, SI is divided into two types: minimum SI and other SI. The minimum SI includes a master information block (MIB) and a system information block (SIB) 1. The other SI includes a SIB2 to a SIB9, and the like. Different SIBs include different contents.

The minimum SI is continuously sent by broadcasting, and the other SI is selectively sent by broadcasting based on a request of user equipment (UE). For example, UE determines whether it is necessary to acquire other SI according to its own service requirement. If it is necessary to acquire the other SI, the UE sends an SI request, and a network side selects the SI requested by the UE for broadcasting.

UE that sends an SI request may read and store other SI broadcast by a network side, while UE that does not send any SI request may not pay attention to the other SI broadcast by the network side. When such UE needs to use the other SI, they may also send SI requests and the network side may rebroadcast the requested other SI based on the received SI requests. The rebroadcast other SI may be the same as the other SI broadcast before. Consequently, radio resources may be wasted.

SUMMARY

The present disclosure provides an SI transmission method, apparatus and system, and a computer-readable storage medium, which may reduce radio resource waste.

According to a first aspect of the present disclosure, an SI transmission method is provided, which may include that a paging message is sent, the paging message including indication information and the indication information being configured to indicate that other SI is to be broadcast in a specified time period, and the other SI indicated by the indication information is broadcast in the specified time period.

Optionally, the indication information may include multiple identifiers, each identifier of the multiple identifiers may correspond to a unique SIB and may be configured to indicate whether the corresponding SIB is to be broadcast in the specified time period. Further, the indication information may include an identifier, and the identifier may be configured to indicate whether all SIBs are to be broadcast in the specified time period. The specified time period may include at least one SI window starting from a first SI window after a radio subframe where the paging message is located.

Optionally, the paging message may further include an SI modification notification, and the SI modification notification may be configured to send updated SI in a next modification period. Further, the paging message may be a short message included in downlink control information (DCI) or a paging message sent on a physical downlink shared channel (PDSCH) indicated by the DCI.

Optionally, the method may further include an SI request sent by a terminal is received, where the SI request includes a SIB identifier.

According to a second aspect of the present disclosure, an SI transmission method is provided, which may include that a paging message is received, the paging message including indication information and the indication information being configured to indicate that other SI is to be broadcast in a specified time period, and the other SI broadcast in the specified time period is received according to the indication information.

Optionally, the indication information may include multiple identifiers, each identifier of the multiple identifiers may correspond to a unique SIB and may be configured to indicate whether the corresponding SIB is to be broadcast in the specified time period. Further, the indication information may include an identifier, and the identifier may be configured to indicate whether all SIBs are to be broadcast in the specified time period. The specified time period may include at least one SI window starting from a first SI window after a radio subframe where the paging message is.

Optionally, the paging message may further include an SI modification notification, and the SI modification notification may be configured to send updated SI in a next modification period. The paging message may be a short message included in DCI or a paging message sent on a PDSCH indicated by the DCI.

In a possible implementation mode, the method may further include, in response to required other SI not being stored, that the required other SI is read from the received other SI, and the read required other SI is stored.

In another possible implementation mode, the operation that the other SI broadcast in the specified time period is received according to the indication information may include: in response to required other SI not being stored, the other SI broadcast in the specified time period is received; and the method may further include that the required other SI is read from the received other SI, and the read required other SI is stored.

Optionally, the operation that the other SI broadcast in the specified time period is received may include scheduling information of the other SI is acquired from a SIB1, at least one SI window starting from a first SI window after a radio subframe where the paging message is located is determined based on the scheduling information, and the other SI is received in an SI window in the determined at least one SI window.

Optionally, the method may further include that an SI request is sent, where the SI request includes a SIB identifier.

According to a third aspect of the present disclosure, an SI transmission apparatus is provided, which may include a sending module that is configured to send a paging message, the paging message including indication information and the indication information being configured to indicate that other SI is to be broadcast in a specified time period, and broadcast the other SI indicated by the indication information in the specified time period.

Optionally, the indication information may include multiple identifiers, each identifier of the multiple identifiers may correspond to a unique SIB and may be configured to indicate whether the corresponding SIB is to be broadcast in the specified time period. Further, the indication information may include an identifier, and the identifier may be configured to indicate whether all SIBs are to be broadcast in the specified time period. The specified time period may include at least one SI window starting from a first SI window after a radio subframe where the paging message is located.

Optionally, the paging message may further include an SI modification notification, and the SI modification notification may be configured to send updated SI in a next modification period. The paging message may be a short message included in DCI or a paging message sent on a PDSCH indicated by the DCI.

Optionally, the apparatus may further include a receiving module that is configured to receive an SI request sent by a terminal, the SI request including a SIB identifier.

According to a fourth aspect of the embodiments of the present disclosure, an SI transmission apparatus is provided, which may include a receiving module that is configured to receive a paging message, the paging message including indication information and the indication information being configured to indicate that other SI is to be broadcast in a specified time period, and receive the other SI broadcast in the specified time period according to the indication information.

Optionally, the indication information may include multiple identifiers, each identifier of the multiple identifiers may correspond to a unique SIB and may be configured to indicate whether the corresponding SIB is to be broadcast in the specified time period. Further, the indication information may include an identifier, and the identifier may be configured to indicate whether all SIBs are to be broadcast in the specified time period. The specified time period may include at least one SI window starting from a first SI window after a radio subframe where the paging message is located.

Optionally, the paging message may further include an SI modification notification, and the SI modification notification may be configured to send updated SI in a next modification period. The paging message may be a short message included in DCI or a paging message sent on a PDSCH indicated by the DCI.

In a possible implementation mode, the apparatus may further include an acquisition module that is configured to, in response to required other SI not being stored, read the required other SI from the other SI received by the receiving module and store the read required other SI.

In another possible implementation mode, the apparatus may further include an acquisition module, the receiving module may be configured to, in response to required other SI not being stored, receive the other SI broadcast in the specified time period, and the acquisition module may be configured to read the required other SI from the other SI received by the receiving module and store the read required other SI.

Optionally, the receiving module may include a scheduling information acquisition submodule that is configured to acquire scheduling information of the other SI from a SIB1, a window determination submodule that is configured to determine at least one SI window starting from a first SI window after a radio subframe where the paging message is located based on the scheduling information acquired by the scheduling information acquisition submodule, and a receiving submodule that is configured to receive the other SI in an SI window in the at least one SI window determined by the window determination submodule. Further, the apparatus may further include a sending module that is configured to send an SI request, the SI request including a SIB identifier.

According to a fifth aspect of the present disclosure, an SI transmission apparatus is provided, which may include a processor, a transceiver, and a memory configured to store instructions executable by the processor. The processor may be configured to send, through the transceiver, a paging message, the paging message including indication information and the indication information being configured to indicate that other SI is to be broadcast in a specified time period, and broadcast the other SI indicated by the indication information in the specified time period.

According to a sixth aspect of the present disclosure, an SI transmission apparatus is provided, which may include a processor, a transceiver; and a memory configured to store instructions executable by the processor, the processor may be configured to receive, through the transceiver, a paging message, the paging message including indication information and the indication information being configured to indicate that other SI is to be broadcast in a specified time period, and receive the other SI broadcast in the specified time period according to the indication information.

According to a seventh aspect of the present disclosure, a non-transitory computer-readable storage medium is provided. When instructions in the computer-readable storage medium may be executed by a processor of an SI transmission apparatus to cause the SI transmission apparatus to execute the SI transmission method as described in the first aspect.

According to an eighth aspect of the present disclosure, a computer-readable storage medium is provided. When instructions in the computer-readable storage medium may be executed by a processor of an SI transmission apparatus to cause the SI transmission apparatus to execute the SI transmission method as described in the second aspect.

According to a ninth aspect of the present disclosure, an SI transmission system is provided, which may include a base station and a terminal. The base station may include the SI transmission apparatus as described in the third aspect, and the terminal may include the SI transmission apparatus as described in the fourth aspect.

The technical solutions provided in the embodiments of the present disclosure have beneficial effects. For example, in the embodiments of the present disclosure, the indication information is included in the paging message such that the terminal may know when the other SI is to be broadcast after receiving the paging message. If requiring other SI, the terminal does not need to send any SI request and may directly receive the other SI according to the indication information to acquire the other SI required by the terminal. In such a manner, the number of SI requests is reduced, and a frequency of repeatedly broadcasting the other SI is reduced. Therefore, radio resource waste may be reduced.

It should be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate exemplary embodiments consistent with the present disclosure and, together with the description, serve to explain the principles of the present disclosure.

DETAILED DESCRIPTION

Figure 1:
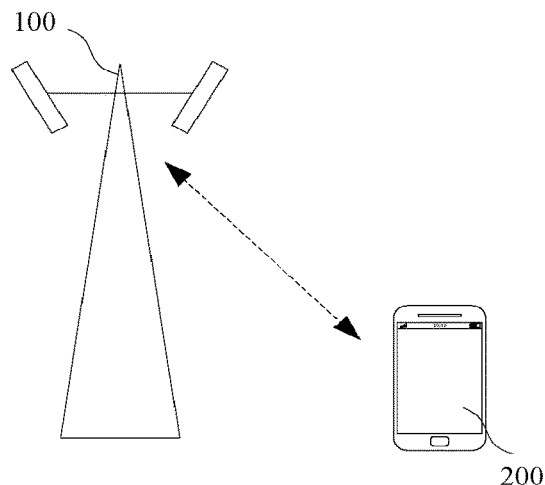
FIG. 1 is a schematic diagram illustrating a network architecture, according to an embodiment of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

For conveniently understanding the technical solutions provided in the embodiments of the present disclosure, SI will be introduced and described at first below.

In a 5G communication technology, SI is cell-level information. The SI is divided into minimum SI and other SI. The minimum SI includes a MIB and a SIB1. The other SI includes other SIBs except the MIB and the SIB1, including, but not limited to, a SIB2 to a SIB9. Different SI includes different contents.

Exemplarily, different SI includes the following contents. The MIB includes cell barred state information and basic physical-layer information of a cell required by reception of the other SI.

The SIB1 provides scheduling information of other system information block and information required by initial access.

The SIB2 includes cell reselection information, and is mainly related to a serving cell.

The SIB3 includes information about cell reselection of a neighbor cell of the same frequency as a service frequency (including a frequency shared cell reselection parameter and a cell-specific reselection parameter).

The SIB4 includes information about reselection of a new radio (NR) cell of a frequency different from the service frequency (including a frequency shared cell reselection parameter and a cell-specific reselection parameter).

The SIB5 includes inter-access-technology cell reselection related information (including evolved universal mobile telecommunications system (UMTS) terrestrial radio access (E-UTRA) frequency shared cell reselection parameter and an E-UTRA network (E-UTRAN) cell specific reselection parameter).

The SIB6 includes a main earthquake and tsunami warning system (ETWS) notification.

The SIB7 includes an auxiliary ETWS notification.

The SIB8 includes a commercial mobile alert service (CMAS) warning notification.

The SIB9 includes information about global positioning system (GPS) time and coordinated universal time (UTC).

Besides the SIB2 to the SIB9, a SIB including information about a multimedia broadcast multicast service (MBMS), a SIB including information about the Internet of vehicles and the like may also be included.

According to different capabilities, UE needs to adopt part of or all SI in the other SI. For example, the MIB and the SIB1 mainly include information required by access network of UE, so that all UE needs to be capable of acquire the MIB and the SIB1. The SIB2 to the SIB5 mainly include information about cell reselection. For fixed UE, a position thereof may not be changed, so that cell reselection is not required, and the fixed UE does not need to acquire the SIB3 to the SIB8. For a terminal not supporting multimedia broadcast, it is unnecessary to acquire the SIB including the information about the MBMS.

The other SI is transmitted in an SI message. A single SI message may include one or more SIBs, and each SIB may be included in only one SI message. Each SI message corresponds to an SI window, and each SI message is broadcast in the corresponding SI window. A length of each SI window is equal and may be configured through the SIB1, and the unit is usually millisecond. Different SI windows do not overlap each other.

FIG. 1 is a schematic diagram illustrating an SI transmission system, according to an embodiment of the present disclosure. Referring to FIG. 1, the system includes a base station 100 and a terminal 200. The base station 100 broadcasts a system message. The terminal 200 receives SI broadcast by the base station 100, and accesses a network or realizes a corresponding service function such as cell reselection based on the acquired SI.

Figure 2:
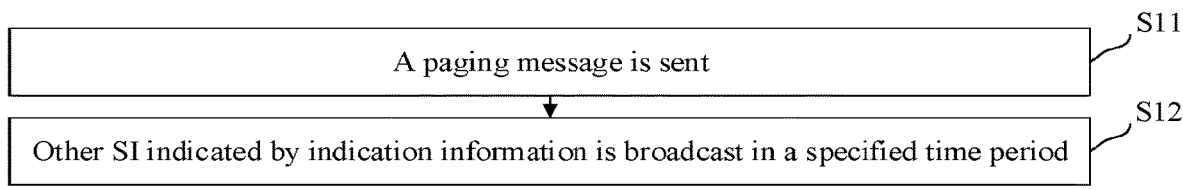
FIG. 2 is a flow chart showing an SI transmission method, according to an exemplary embodiment.

FIG. 2 is a flow chart showing an SI transmission method, according to an exemplary embodiment. The method may be executed by a base station (for example, the base station 100 in FIG. 1). The method of the embodiment may also be called an SI broadcast method. Referring to FIG. 2, the SI transmission method includes as follows.

In step S11, a paging message is sent. The paging message includes indication information, and the indication information is configured to indicate that other SI is to be broadcast in a specified time period.

In step S12, the other SI indicated by the indication information is broadcast in the specified time period. Optionally, the indication information may include multiple identifiers, each identifier corresponds to a unique SIB and is configured to indicate whether the corresponding SIB is to be broadcast in the specified time period. Here, the identifier may include multiple bits, and each bit corresponds to a unique SIB. For example, if the other SI includes eight SIBs, the identifier includes eight bits, and each bit corresponds to a SIB. When a bit is 1 (or 0), it is indicated that the corresponding SIB is to be broadcast in the specified time period. When a bit is 0 (or 1), it is indicated that the corresponding SIB is not to be broadcast in the specified time period.

Optionally, the indication information may include an identifier, and the identifier is configured to indicate whether all SIBs are to be broadcast in the specified time period. Here, the identifier may adopt one bit. When the bit is 1 (or 0), it is indicated that all the SIBs are to be broadcast in the specified time period. When the bit is 0 (or 1), it is indicated that all the SIBs are not to be broadcast in the specified time period.

Optionally, the indication information may include an identifier, and the identifier may be configured to indicate that any one or more SIBs are to be broadcast in the specified time period. Here, the identifier may adopt one bit. When the bit is 1 (or 0), it is indicated that all the SIBs are to be broadcast in the specified time period. When the bit is 0 (or 1), it is indicated that no SIB is to be broadcast in the specified time period.

Optionally, the specified time period includes at least one SI window starting from a first SI window after a radio subframe where the paging message is located. Alternatively, the specified time period may also be a next modification period after the radio subframe where the paging message is located. The radio subframe where the paging message is located needs to be determined through both a radio frame number and a radio subframe number, for example, a radio subframe 3 of a radio frame 10, a radio subframe 6 of a radio frame 15 and the like.

Optionally, the paging message also includes an SI modification notification, and the SI modification notification is configured to send updated SI in the next modification period. Of course, the SI modification notification may also not be included.

In the embodiments, the modification period may be a broadcast control channel (BCCH) modification period.

Optionally, the paging message is a short message included in DCI or a paging message sent on a PDSCH indicated by the DCI.

Optionally, the method further can further include that an SI request sent by a terminal is received, and the SI request includes a SIB identifier.

It is to be noted that steps S11 to S12 and the abovementioned optional step may be freely combined.

Figure 3:
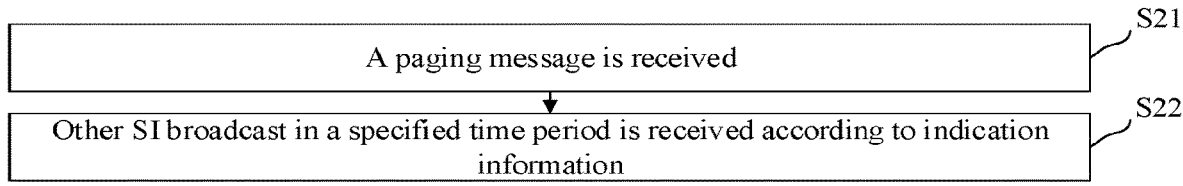
FIG. 3 is a flow chart showing an SI transmission method, according to an exemplary embodiment.

FIG. 3 is a flow chart showing an SI transmission method, according to an exemplary embodiment. The method may be executed by a terminal (for example, the terminal 200 in FIG. 1). The method of the embodiment may also be called an SI acquisition method. Referring to FIG. 3, the SI transmission method includes as follows.

In step S21, a paging message is received. The paging message includes indication information, and the indication information is configured to indicate that other SI is to be broadcast in a specified time period.

In step S22, the other SI broadcast in the specified time period is received according to the indication information. Descriptions about the indication information and the specified time period refer to the embodiment related to FIG. 1, and detailed descriptions are omitted herein.

Optionally, the paging message is a short message included in DCI or a paging message sent on a PDSCH indicated by the DCI.

Optionally, the method further includes that, when required other SI is not stored, the required other SI is read from the received other SI, and the read required other SI is stored.

Optionally, the operation that the other SI broadcast in the specified time period is received according to the indication information includes that, when the required other SI is not stored, the other SI broadcast in the specified time period is received, and correspondingly, the method further includes that the required other SI is read from the received other SI, and the read required other SI is stored.

Optionally, the operation that the other SI broadcast in the specified time period is received includes that scheduling information of the other SI is acquired from a SIB1, at least one SI window starting from a first SI window after a radio subframe where the paging message is located is determined based on the scheduling information, and the other SI is received in an SI window in the determined at least one SI window.

Optionally, the method further includes that an SI request is sent, the SI request including a SIB identifier.

It is to be noted that steps S21 to S22 and the abovementioned optional steps may be freely combined.

Figure 4:
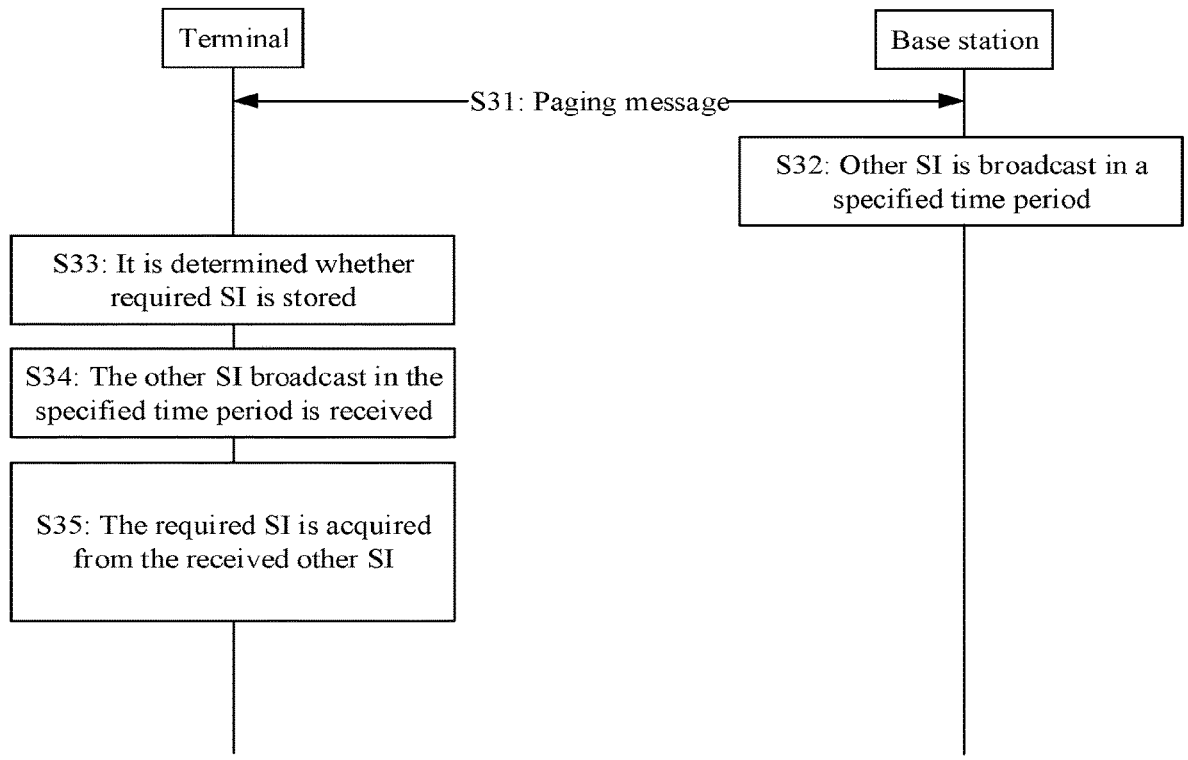
FIG. 4 is an interactive flow chart showing an SI transmission method, according to an exemplary embodiment.

FIG. 4 is a flow chart showing an SI transmission method, according to an exemplary embodiment. Referring to FIG. 4, the SI transmission method includes as follows.

In step S31, a base station sends a paging message. Correspondingly, a terminal receives the paging message sent by the base station. Here, the terminal may be all or part of terminals in a cell corresponding to the base station, including a terminal in an idle state and a terminal in a connected state.

The paging message includes indication information, and the indication information is configured to indicate that other SI is to be broadcast in a specified time period.

In an optional implementation mode, the indication information may include multiple identifiers, each identifier corresponds to a unique SIB and is configured to indicate whether the corresponding SIB is to be broadcast in the specified time period. Here, the identifier may include multiple bits, and each bit corresponds to a unique SIB. For example, if the other SI includes eight SIBs, the identifier includes eight bits, and each bit corresponds to a SIB. When a bit is 1 (or 0), it is indicated that the corresponding SIB is to be broadcast in the specified time period. When a bit is 0 (or 1), it is indicated that the corresponding SIB is not to be broadcast in the specified time period. In such a manner, the terminal may conveniently determine the specific SIBs to be broadcast to further determine a subsequent operation.

In another optional implementation mode, the indication information includes an identifier, and the identifier is configured to indicate whether all SIBs are to be broadcast in the specified time period. Here, the identifier may adopt one bit. When the bit is 1 (or 0), it is indicated that all the SIBs are to be broadcast in the specified time period. When the bit is 0 (or 1), it is indicated that all the SIBs are not to be broadcast in the specified time period. In such a manner, the indication information occupies few bits, and resources are saved.

In another optional implementation mode, the abovementioned two manners may be combined for use. For example, when all the SIBs are to be broadcast in the specified time period, the indication information is an identifier; and when part of SIBs are to be broadcast in the specified time period, the indication information includes multiple identifiers indicating the SIBs to be broadcast respectively.

Optionally, the paging message also includes an SI modification notification, and the SI modification notification is configured to indicate that updated SI is sent in a next modification period.

In the embodiments, the modification period may be a BCCH modification period.

As described above, SI is usually sent in an SI window. Therefore, the specified time period may also take SI window as the unit. Exemplarily, the specified time period may include at least one SI window starting from a first SI window after a radio subframe where the paging message is located. That is, the specified time period is the first SI window after the radio subframe where the paging message is located. Or, the specified time period may be at least two SI windows from the first SI window after the radio subframe where the paging message is located.

Under a condition, when the other SI is broadcast through at least two SI windows, two continuous SI windows may include the same SIB. For example, if one SI message is enough to include all the other SI which needs to be broadcast, on the premise that each SI message needs to be sent through an SI window, for improving the probability that the terminal receives the other SI, the other SI to be broadcast is repeatedly broadcast through at least two SI windows.

Under another condition, when the other SI is broadcast through at least two SI windows, two continuous SI windows may also include different SIBs. For example, if multiple SI messages need to include all the other SI which needs to be broadcast, on the premise that each SI message needs to be sent through an SI window, the specified time period needs to include multiple SI windows, namely the base station needs to broadcast all the other SI which needs to be broadcast through the multiple SI windows.

The base station may send the paging message before the other SI needs to be broadcast. For example, the base station, after receiving SI requests sent by one or more terminals, may determine that other SI needs to be broadcast and then send the paging message including the indication information. Therefore, the method in the embodiment may further include that the terminal sends an SI request, and the base station receives the SI request sent by the terminal, the SI request including a SIB identifier. For another example, the base station may actively determine that the other SI needs to be broadcast and send the paging message including the indication information before broadcasting the other SI. It is to be noted that the terminal receiving the paging message may be a terminal that sends an SI request and may also be a terminal that does not send any SI request.

The SIB identifier is configured to indicate other SI required by the terminal. Optionally, the SIB identifier may be a SIB number or an index of a random access code. The index of the random access code forms a one-to-one mapping relationship with the SIB number and thus may serve as the SIB identifier to indicate the other SI required by the terminal. It is to be noted that the number of random access codes is greater than the number of the SIBs. For example, the number of the random access codes is 64, and the number of the SIBs is 9. Therefore, 9 random access codes may be selected from the 64 random access codes to be associated with the SIBs.

Optionally, the paging message is a short message included in DCI or a paging message sent on a PDSCH indicated by the DCI.

In step S32, the base station broadcasts other SI in a specified time period.

In step S32, the base station broadcasts the other SI indicated by the indication information.

In step S33, a terminal determines whether required SI is stored.

If the required SI is not stored, step S34 is executed. If the required SI is stored, the present flow is stopped.

In a possible implementation mode, step S33 may include as follows.

In step 1, the terminal may determine the required SI according to its own capability. For example, if the terminal is mobile, the terminal needs to support cell reselection, so that the SI required by the terminal includes the SIB2 to the SIB5.

In step 2, the terminal judges whether locally stored information includes the required SI. For example, the terminal may search a local specified storage space for stored SI and determine whether the found stored SI includes the required SI.

In another possible implementation mode, the terminal, after locally storing the required SI, may set a flag bit to indicate that the required SI is stored. In such case, it may be determined whether the required SI is stored according to the flag bit.

It is to be noted that steps S33 and S34 may be executed in a random sequence.

In step S34, the terminal receives the other SI broadcast in the specified time period.

Step S34 may include as follows.

In step 1, scheduling information of the other SI is acquired from a SIB1. The scheduling information of the other SI may indicate whether to broadcast the other SI, whether a modification is made and a specific time-frequency resource for broadcasting.

In step 2, at least one SI window starting from a first SI window after a radio subframe where the paging message is located is determined based on the scheduling information. The scheduling information may be included in a scheduling information list (SchedulingInfoList). A length of the SI window, a starting position of the SI window corresponding to each SI message (a starting frame and starting subframe in an SI period) and the like may be determined through the scheduling information.

In step 3, the other SI is received in an SI window in the determined at least one SI window.

In step 1, the SIB1 may be pre-acquired and locally stored by the terminal, and the scheduling information of the other SI in the local SIB1 may be directly read. Or, the SIB1 may also be received by the terminal after determining that the required SI is not stored.

In step S35, the terminal acquires required SI from the received other SI.

Step S35 may include that the terminal reads the required other SI from the received other SI and stores the read required other SI. Under the condition that the indication information indicates that all the SIBs are to be broadcast in the specified time period, the terminal may receive all the SIBs and thus may certainly acquire the required SI from the received other SI.

Under the condition that the indication information indicates that part of SIBs are to be broadcast in the specified time period, the SIBs received by the terminal may include no required SI. In such case, before step S34, the method may further include: whether the other SI indicated by the indication information includes the required SI is determined according to the indication information. Correspondingly, step S34 may include that, when the other SI indicated by the indication information includes the required SI, the other SI broadcast in the specified time period is received, and, when the other SI indicated by the indication information does not include the required SI, the other SI broadcast in the specified time period is not received, namely the present flow is stopped.

Through steps S33 to S35, the terminal may acquire the required other SI according to the indication information. It is to be noted that, in the embodiments, when the required other SI is not stored, the other SI broadcast in the specified time period is received, then the required other SI is read from the received other SI, and the read required other SI is stored. In another embodiments, the other SI broadcast in the specified time period may be directly received according to the indication information, and when the required other SI is not stored, the required other SI is read from the received other SI, and the read required other SI is stored.

In the embodiments of the present disclosure, the indication information is included in the paging message such that the terminal may know when the other SI is to be broadcast after receiving the paging message. If requiring other SI, the terminal does not need to send any SI request and may directly receive the other SI according to the indication information to acquire the other SI required by the terminal. In such a manner, the number of SI requests is reduced, and a frequency of repeatedly broadcasting the other SI is reduced. Therefore, radio resource waste may be reduced.

In addition, for a terminal which needs to acquire other SI, since knowing time when the other SI is broadcast, the terminal only needs to receive the other SI in a specified time period and may be kept in a dormant state at other time, and does not need to keep monitoring the SIB1 to acquire scheduling information therein after sending an SI request. Therefore, according to the method provided in the present disclosure, the energy consumption of the terminal may be reduced.

Figure 5:
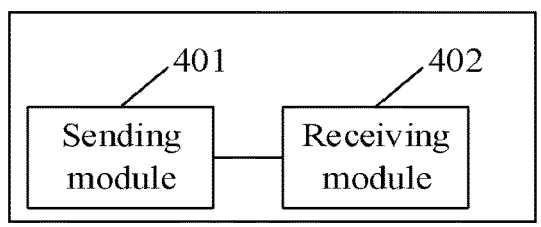
FIG. 5 is a structure diagram of an SI transmission apparatus, according to an exemplary embodiment.

FIG. 5 is a structure diagram of an SI transmission apparatus, according to an exemplary embodiment. As shown in FIG. 5, the apparatus 400 includes a sending module 401. The sending module 401 is configured to send a paging message, the paging message including indication information and the indication information being configured to indicate that other SI is to be broadcast in a specified time period, and broadcast the other SI indicated by the indication information in the specified time period. Of course, it should be understood that one or more of the modules described in this disclosure can be implemented by hardware, for example, circuitry.

Optionally, the apparatus further includes a receiving module 402. The receiving module 402 is configured to receive an SI request sent by a terminal, the SI request including a SIB identifier.

Related descriptions about the indication information, the paging message, the specified time period and the SIB identifier may refer to the abovementioned method embodiments, and elaborations are omitted herein.

Figure 6:
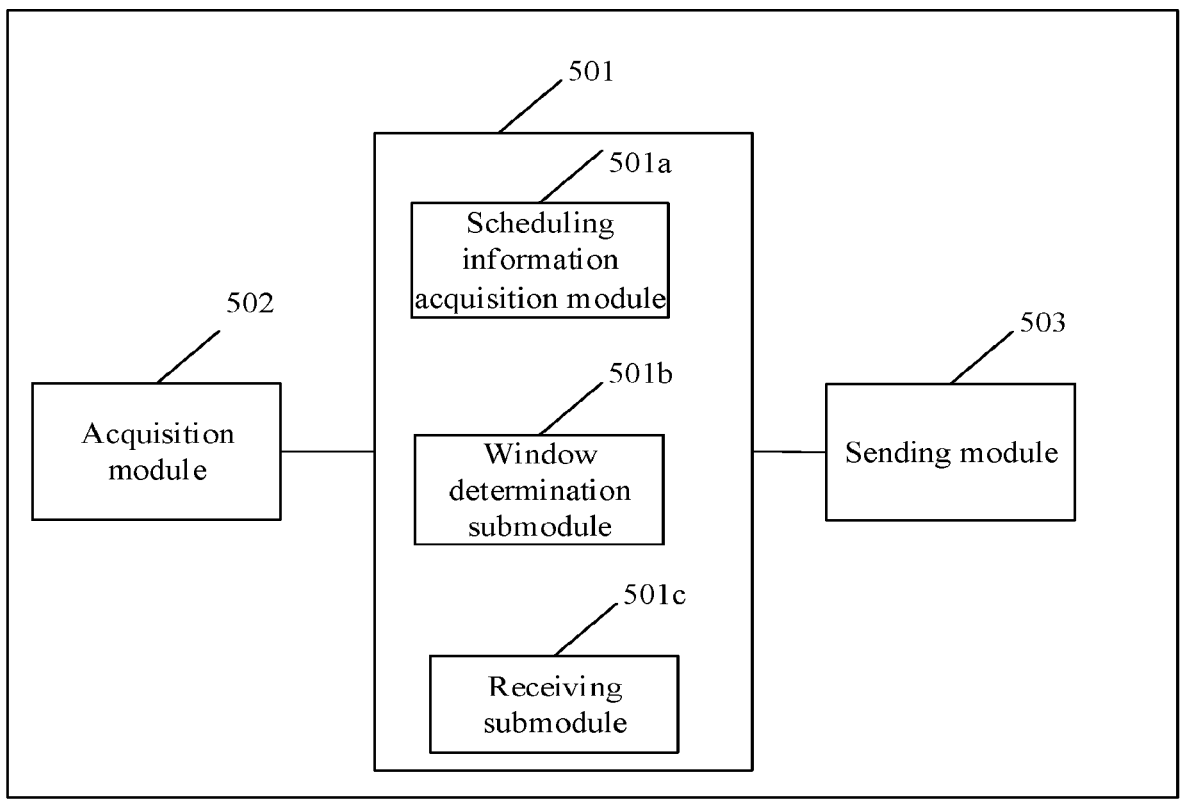
FIG. 6 is a structure diagram of an SI transmission apparatus, according to an exemplary embodiment.

FIG. 6 is a structure diagram of an SI transmission apparatus, according to an exemplary embodiment. As shown in FIG. 6, the apparatus 500 includes a receiving module 501. The receiving module 501 is configured to receive a paging message, the paging message including indication information and the indication information being configured to indicate that other SI is to be broadcast in a specified time period, and receive the other SI broadcast in the specified time period according to the indication information.

Optionally, the apparatus further includes an acquisition module 502. The acquisition module 502 is configured to, when required other SI is not stored, read the required other SI from the other SI received by the receiving module 501 and store the read required other SI.

Optionally, the receiving module 501 is configured to, when the required other SI is not stored, receive the other SI broadcast in the specified time period. The acquisition module 502 is configured to read the required other SI from the other SI received by the receiving module 501 and store the read required other SI.

In the embodiment, the receiving module 501 may include a scheduling information acquisition submodule 501a, a window determination submodule 501b and a receiving submodule 501c. The scheduling information acquisition submodule 501a is configured to acquire scheduling information of the other SI from a SIB1. The window determination submodule 501b is configured to determine at least one SI window starting from a first SI window after a radio subframe where the paging message is located based on the scheduling information acquired by the scheduling information acquisition submodule. The receiving submodule 501c is configured to receive the other SI in an SI window in the at least one SI window determined by the window determination submodule 501b.

Optionally, the apparatus further includes a sending module 503. The sending module 503 is configured to send an SI request, the SI request including a SIB identifier.

Related descriptions about the indication information, the paging message, the specified time period and the SIB identifier may refer to the abovementioned method embodiments, and elaborations are omitted herein.

In the embodiments of the present disclosure, the indication information is included in the paging message such that the terminal may know when the other SI is to be broadcast after receiving the paging message. If requiring other SI, the terminal does not need to send any SI request and may directly receive the other SI according to the indication information to acquire the other SI required by the terminal. In such a manner, the number of SI requests is reduced, and a frequency of repeatedly broadcasting the other SI is reduced. Therefore, radio resource waste may be reduced.

In addition, for a terminal which needs to acquire other SI, since knowing time when the other SI is broadcast, the terminal only needs to receive the other SI in a specified time period and may be kept in a dormant state at other time, and does not need to keep monitoring the SIB1 to acquire scheduling information therein after sending an SI request. Therefore, according to the method provided in the present disclosure, the energy consumption of the terminal may be reduced.

With respect to the apparatus in the above embodiment, the specific manners for performing operations for individual modules therein have been described in detail in the embodiments regarding the method, which will not be repeated herein.

The embodiment of the present disclosure also provides an SI transmission apparatus, which includes a transceiver, a memory and a processor. The transceiver is configured to receive and send information. The memory is configured to store instructions executable by the processor. The processor is configured to send, through the transceiver, a paging message, the paging message including indication information and the indication information being configured to indicate that other SI is to be broadcast in a specified time period, and broadcast the other SI indicated by the indication information in the specified time period.

Figure 7:
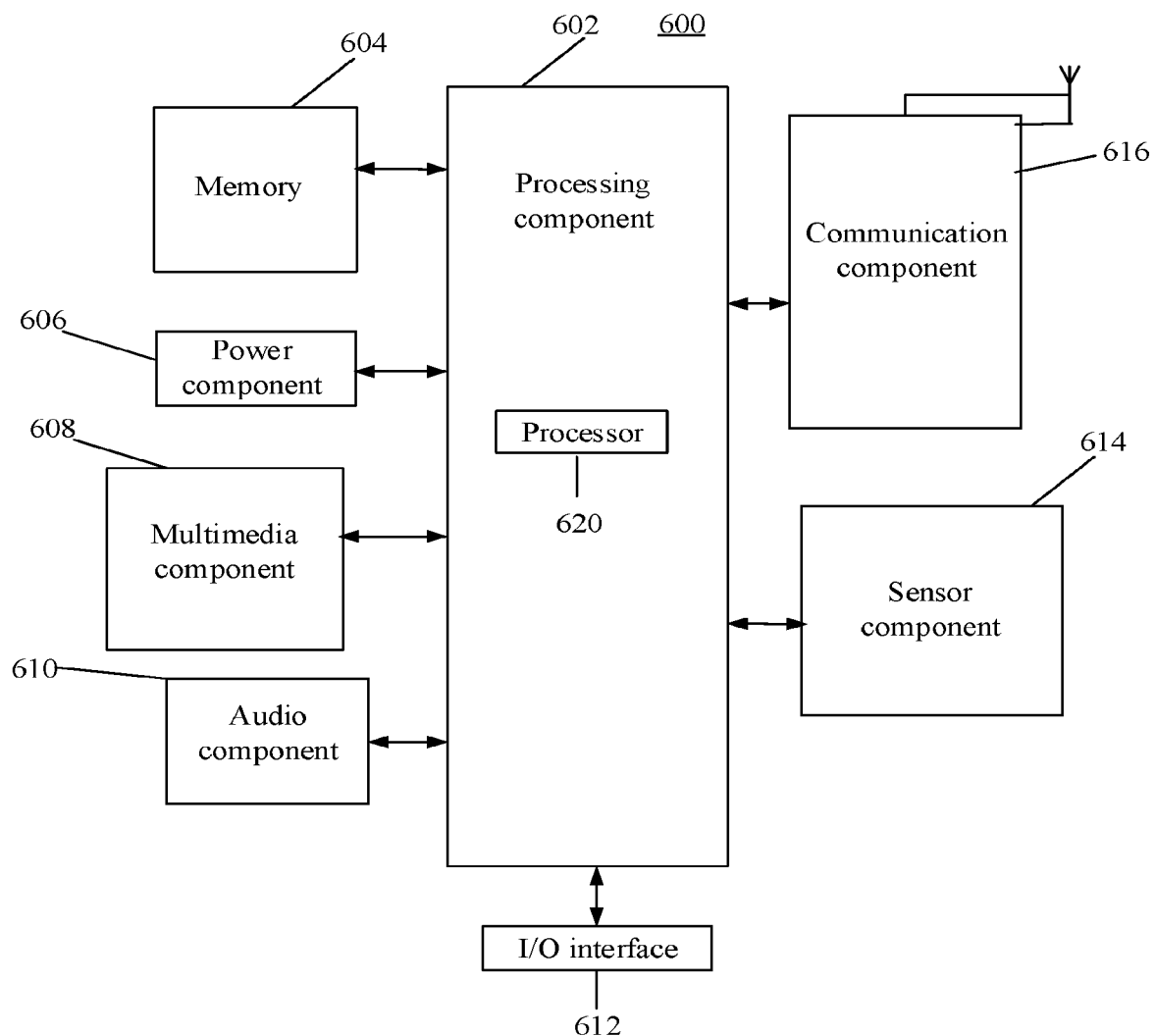
FIG. 7 is a block diagram of an SI transmission apparatus, according to an exemplary embodiment.

FIG. 7 is a block diagram of an SI transmission apparatus 600, according to an exemplary embodiment. The apparatus 600 may be any above terminal. Referring to FIG. 7, the SI transmission apparatus 600 may include one or more of the following components: a processing component 602, a memory 604, a power component 606, a multimedia component 608, an audio component 610, an input/output (I/O) interface 612, a sensor component 614, or a communication component 616.

The processing component 602 typically controls overall operations of the apparatus 600, such as the operations associated with display, telephone calls, data communications, camera operations, and recording operations. The processing component 602 may include one or more processors 620 to execute instructions to perform all or part of the steps in the abovementioned method. Moreover, the processing component 602 may include one or more modules which facilitate interaction between the processing component 602 and other components. For instance, the processing component 602 may include a multimedia module to facilitate interaction between the multimedia component 608 and the processing component 602.

The memory 604 is configured to store various types of data to support the operation of the apparatus 600. Examples of such data include instructions for any applications or methods operated on the apparatus 600, contact data, phonebook data, messages, pictures, video, and the like. The memory 604 may be implemented by any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, and a magnetic or optical disk.

The power component 606 provides power for various components of the apparatus 600. The power component 606 may include a power management system, one or more power supplies, and other components associated with generation, management and distribution of power for the apparatus 600.

The multimedia component 608 includes a screen providing an output interface between the apparatus 600 and a user. In some embodiments, the screen may include a liquid crystal display (LCD) and a touch panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also detect a period of time and a pressure associated with the touch or swipe action. In some embodiments, the multimedia component 608 includes a front camera and/or a rear camera. The front camera and/or the rear camera may receive external multimedia data when the apparatus 600 is in an operation mode, such as a photographing mode or a video mode. Each of the front camera and the rear camera may be a fixed optical lens system or have focusing and optical zooming capabilities.

The audio component 610 is configured to output and/or input an audio signal. For example, the audio component 610 includes a microphone (MIC), and the MIC is configured to receive an external audio signal when the apparatus 600 is in an operation mode, such as a call mode, a recording mode and a voice recognition mode. The received audio signal may further be stored in the memory 604 or sent through the communication component 616. In some embodiments, the audio component 610 further includes a speaker configured to output the audio signal.

The I/O interface 612 provides an interface between the processing component 602 and peripheral interface modules, such as a keyboard, a click wheel, buttons, and the like. The buttons may include, but are not limited to: a home button, a volume button, a starting button and a locking button.

The sensor component 614 includes one or more sensors configured to provide status assessments in various aspects for the apparatus 600. For instance, the sensor component 614 may detect an on/off status of the apparatus 600 and relative positioning of components, such as a display and small keyboard of the apparatus 600, and the sensor component 614 may further detect a change in a position of the apparatus 600 or a component of the apparatus 600, presence or absence of contact between the user and the apparatus 600, orientation or acceleration/deceleration of the apparatus 600 and a change in temperature of the apparatus 600. The sensor component 614 may include a proximity sensor configured to detect presence of an object nearby without any physical contact. The sensor component 614 may also include a light sensor, such as a complementary metal oxide semiconductor (CMOS) or charge coupled device (CCD) image sensor, configured for use in an imaging application. In some embodiments, the sensor component 614 may also include an acceleration sensor, a gyroscope sensor, a magnetic sensor, a pressure sensor or a temperature sensor.

The communication component 616 is configured to facilitate wireless communication between the apparatus 600 and other devices. In the embodiment of the present disclosure, the communication component 616 may access any communication-standard-based wireless network, for example, 2nd-generation (2G), 3rd-generation (3G), 4th-generation (4G), 5G or a combination thereof, thereby implementing signal transmission. In an exemplary embodiment, the communication component 616 receives a broadcast signal or broadcast associated information from an external broadcast management system through a broadcast channel. Optionally, the communication component 616 further includes a near field communication (NFC) module. For example, the NFC module may be implemented based on a radio frequency identification (RFID) technology, an infrared data association (IrDA) technology, an ultra-wide band (UWB) technology, a Bluetooth (BT) technology, and other technologies.

In an exemplary embodiment, the SI transmission apparatus 600 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors or other electronic components, and is configured to execute the SI transmission method.

In an exemplary embodiment, there is also provided a non-transitory computer-readable storage medium including instructions, such as included in the memory 604, executable by the processor 620 of the SI transmission apparatus 600 for performing the SI transmission method. For example, the non-transitory computer-readable storage medium may be a ROM, a random access memory (RAM), a compact disc read-only memory (CD-ROM), a magnetic tape, a floppy disc, an optical data storage device, and the like.

The embodiment of the present disclosure also provides an SI transmission apparatus, which includes a transceiver, a memory and a processor. The transceiver is configured to receive and send information. The memory is configured to store instructions executable by the processor. The processor is configured to receive, through the transceiver, a paging message, the paging message including indication information and the indication information being configured to indicate that other SI is to be broadcast in a specified time period, and receive the other SI broadcast in the specified time period according to the indication information.

Figure 8:
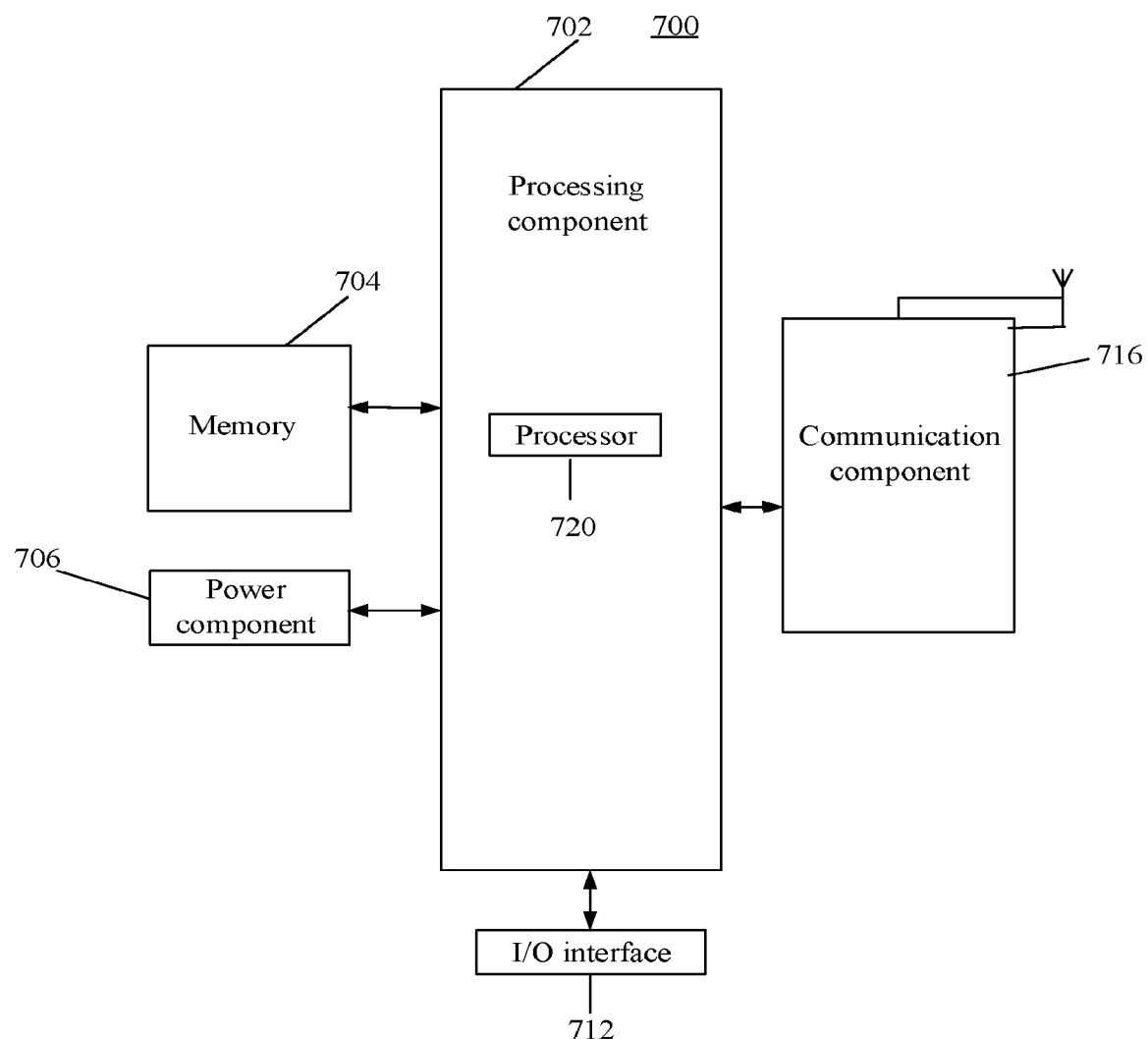
FIG. 8 is a block diagram of an SI transmission apparatus, according to an exemplary embodiment.

FIG. 8 is a block diagram of an SI transmission apparatus 700, according to an exemplary embodiment. The apparatus 700 may be any above base station. Referring to FIG. 8, the SI transmission apparatus 700 may include one or more of the following components: a processing component 702, a memory 704, a power component 706, an I/O interface 712 or a communication component 716.

The processing component 702 typically controls overall operations of the apparatus 700, such as the operations associated with display, telephone calls, data communications, and recording operations. The processing component 702 may include one or more processors 720 to execute instructions to perform all or part of the steps in the abovementioned method. Moreover, the processing component 702 may include one or more modules which facilitate interaction between the processing component 702 and other components. For instance, the processing component 702 may include a multimedia module to facilitate interaction between the multimedia component 708 and the processing component 702.

The memory 704 is configured to store various types of data to support the operation of the apparatus 700. Examples of such data include instructions for any applications or methods operated on the apparatus 700, contact data, phonebook data, messages, pictures, video, and the like. The memory 704 may be implemented by any type of volatile or non-volatile memory devices, or a combination thereof, such as an SRAM, an EEPROM, an EPROM, a PROM, a ROM, a magnetic memory, a flash memory, and a magnetic or optical disk.

The power component 706 provides power for various components of the apparatus 700. The power component 706 may include a power management system, one or more power supplies, and other components associated with generation, management and distribution of power for the apparatus 700.

The I/O interface 712 provides an interface between the processing component 702 and peripheral interface modules, such as a keyboard, a click wheel, buttons and the like. The buttons may include, but are not limited to: a home button, a volume button, a starting button and a locking button.

The communication component 716 is configured to facilitate wireless communication between the base station and other devices. In the embodiment of the present disclosure, the communication component 716 may provide any communication-standard-based wireless network, for example, 2G, 3G, 4G, 5G or a combination thereof, thereby implementing connection with a terminal device.

In an exemplary embodiment, the SI transmission apparatus 700 may be implemented by one or more ASICs, DSPs, DSPDs, PLDs, FPGAs, controllers, micro-controllers, microprocessors or other electronic components, and is configured to execute the SI transmission method.

In an exemplary embodiment, there is also provided a non-transitory computer-readable storage medium including instructions, such as included in the memory 704, executable by the processor 720 of the SI transmission apparatus 700 for performing the SI transmission method. For example, the non-transitory computer-readable storage medium may be a ROM, a RAM, a CD-ROM, a magnetic tape, a floppy disc, an optical data storage device, and the like.

Other implementation solutions of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A system information (SI) transmission method, comprising:
    sending a paging message that includes indication information configured to indicate that other SI is to be broadcast in a specified time period, wherein the specified time period comprises at least two SI windows from a SI window after a radio subframe where the paging message is located; and
    broadcasting the other SI indicated by the indication information in the specified time period, wherein two continuous SI windows comprise a same system information block (SIB).

2. The method of claim 1, wherein the indication information comprises multiple identifiers with each identifier of the multiple identifiers corresponding to a unique SIB and being configured to indicate whether the corresponding SIB is to be broadcast in the specified time period.

3. The method of claim 1, wherein the indication information comprises an identifier that indicates whether all SIBs are to be broadcast in the specified time period.

4. The method of claim 1, wherein the paging message further comprises an SI modification notification that is configured to send updated SI in a next modification period.

5. The method of claim 1, wherein the paging message is a short message included in downlink control information (DCI) or a paging message sent on a physical downlink shared channel (PDSCH) indicated by the DCI.

6. The method of claim 1, further comprising:
    receiving an SI request sent by a terminal, the SI request comprising a SIB identifier.

7. A system information (SI) transmission method, comprising:
    receiving a paging message including indication information that indicates that other SI is to be broadcast in a specified time period, wherein the specified time period comprises at least two SI windows from a SI window after a radio subframe where the paging message is located; and
    receiving the other SI broadcast in the specified time period according to the indication information, wherein two continuous SI windows comprise a same system information block (SIB).

8. The method of claim 7, wherein the indication information comprises multiple identifiers with each identifier of the multiple identifiers corresponding to a unique SIB and being configured to indicate whether the corresponding SIB is to be broadcast in the specified time period.

9. The method of claim 7, wherein the indication information comprises an identifier that is configured to indicate whether all SIBs are to be broadcast in the specified time period.

10. The method of claim 7, wherein the paging message further comprises an SI modification notification that is configured to send updated SI in a next modification period.

11. The method of claim 7, wherein the paging message is a short message included in downlink control information (DCI) or a paging message sent on a physical downlink shared channel (PDSCH) indicated by the DCI.

12. The method of claim 7, wherein receiving the other SI broadcast in the specified time period according to the indication information comprises:

reading, when required other SI is not stored, the required other SI from the received other SI, and storing the read required other SI.

13. The method of claim 12, wherein receiving the other SI broadcast in the specified time period further comprises:
acquiring scheduling information of the other SI from an SIB1;
determining at least one SI window starting from a first SI window after a radio subframe where the paging message is located based on the scheduling information; and
receiving the other SI in an SI window in the determined at least one SI window.

14. The method of claim 7, wherein receiving the other SI broadcast in the specified time period according to the indication information comprises:
receiving, when required other SI is not stored, the other SI broadcast in the specified time period; and
the method further comprises:
reading the required other SI from the received other SI, and
storing the read required other SI.

15. The method of claim 7, further comprising:
sending an SI request, the SI request including an SIB identifier.

16. A system information (SI) transmission apparatus, comprising:
a processor;
a transceiver; and
a memory configured to store instructions executable by the processor,
wherein the processor is configured to:
send, through the transceiver, a paging message including indication information that is configured to indicate that other SI is to be broadcast in a specified time period, wherein the specified time period comprises at least two SI windows from a SI window after a radio subframe where the paging message is located; and
broadcast the other SI indicated by the indication information in the specified time period, wherein two continuous SI windows comprise a same system information block (SIB).

17. A system information (SI) transmission apparatus implementing operations of the SI transmission method of claim 7, comprising:
a processor;
a transceiver;
a memory configured to store instructions executable by the processor;
wherein the processor is configured to:
receive, through the transceiver, a paging message including indication information that is configured to indicate that other SI is to be broadcast in a specified time period, wherein the specified time period comprises at least two SI windows from a SI window after a radio subframe where the paging message is located; and
receive the other SI broadcast in the specified time period according to the indication information, wherein two continuous SI windows comprise a same SIB.

* * * * *